Oct. 13, 1970    G. C. HILFINGER ET AL    3,533,190
COMPOSITE DOOR
Filed Sept. 3, 1968                    5 Sheets-Sheet 2
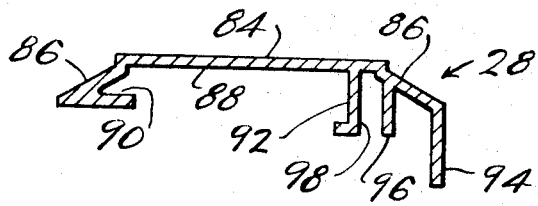
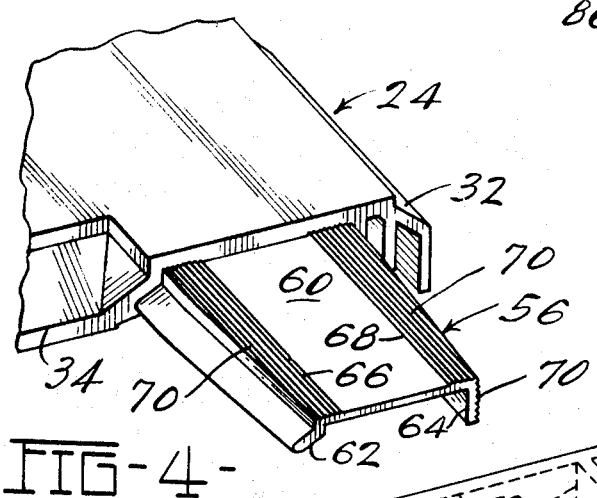
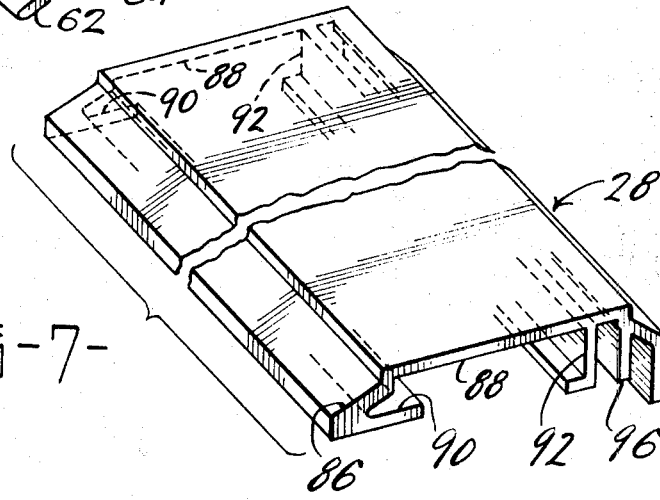
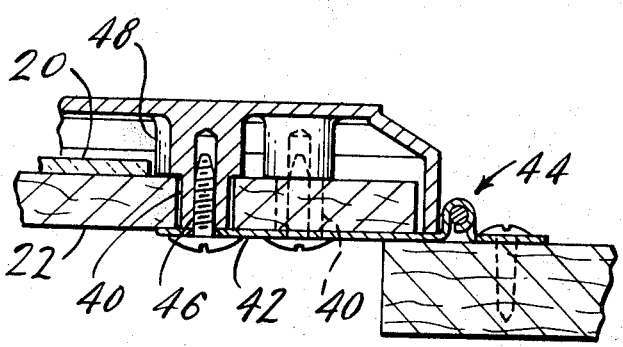
INVENTORS:
X D. JOHNSON,
GEORGE C. HILFINGER.
BY
Owen & Owen
ATT'YS.

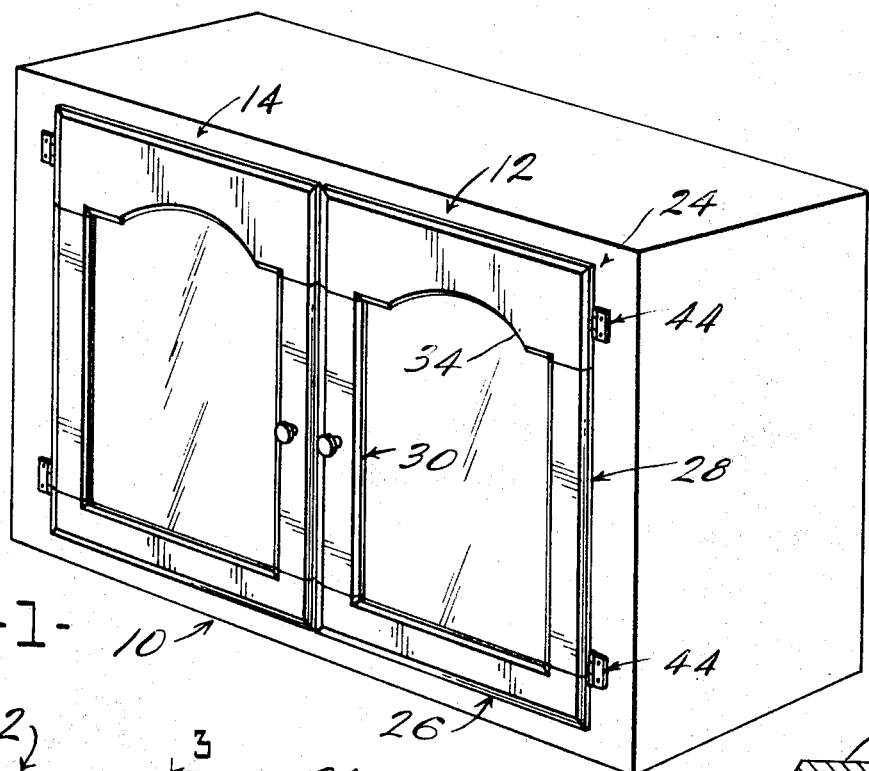
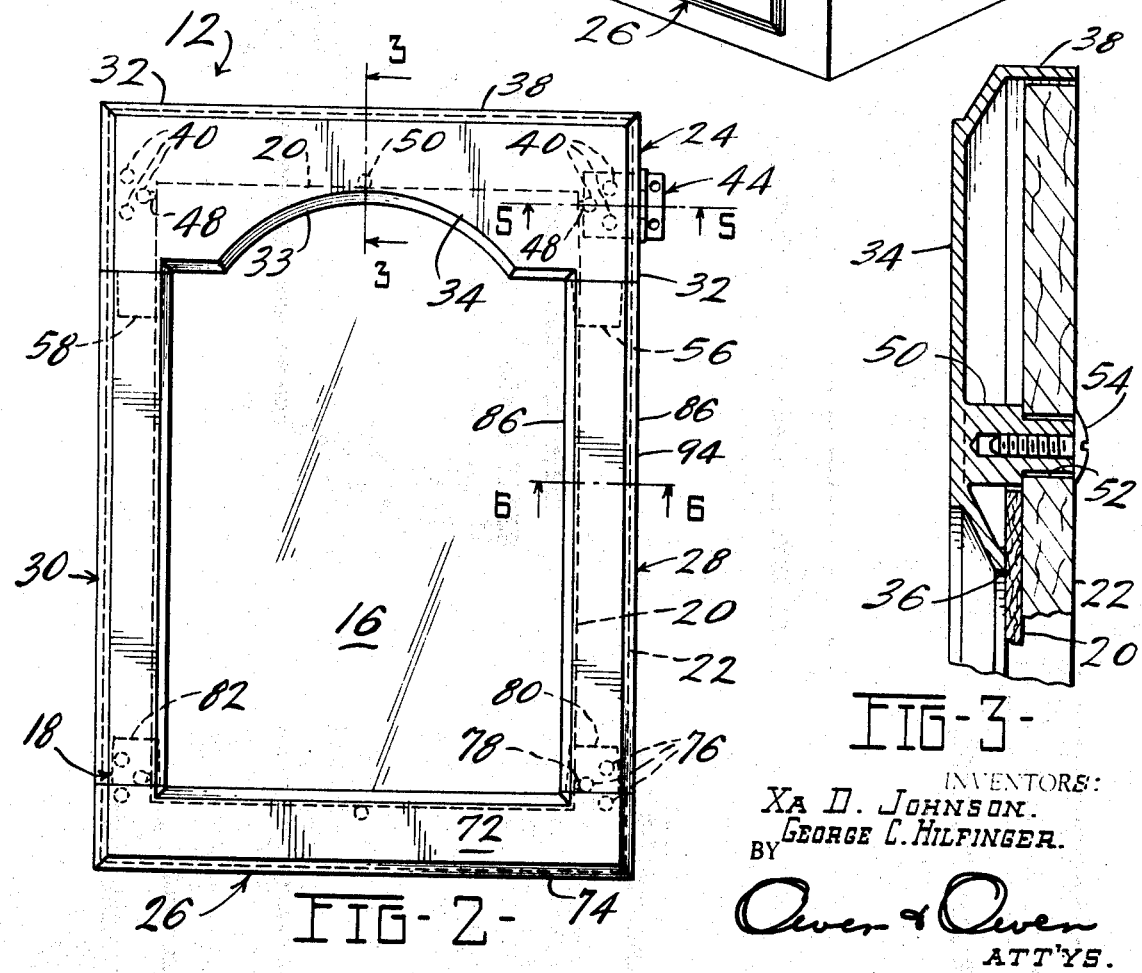
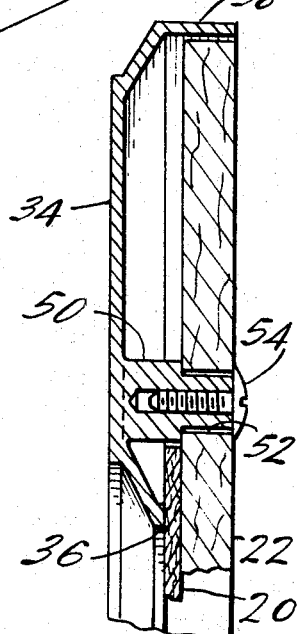

Oct. 13, 1970 G. C. HILFINGER ET AL 3,533,190
COMPOSITE DOOR
Filed Sept. 3, 1968 5 Sheets-Sheet 3
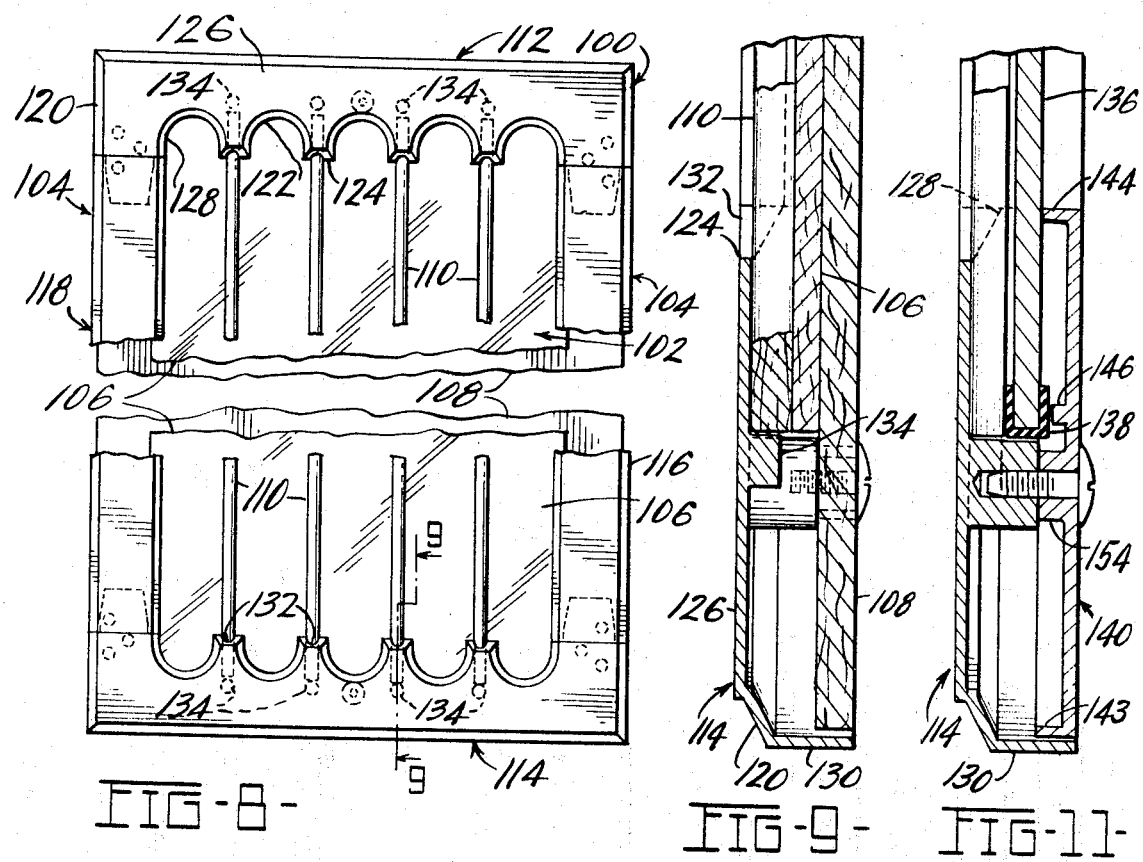
FIG-8- FIG-9- FIG-11-
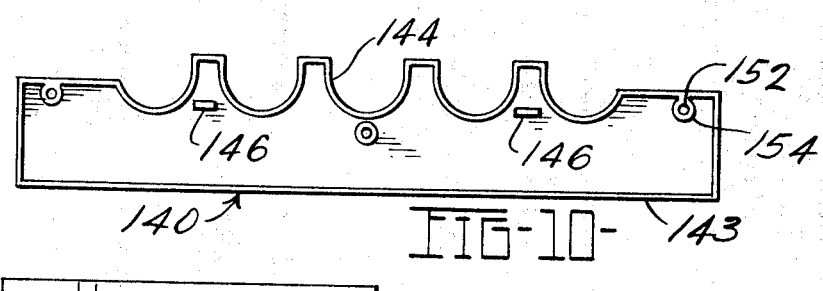
FIG-10-
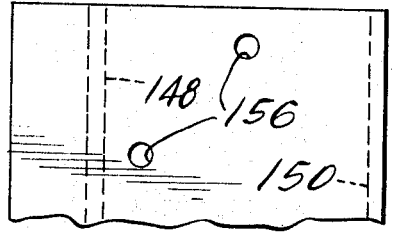
FIG-12-
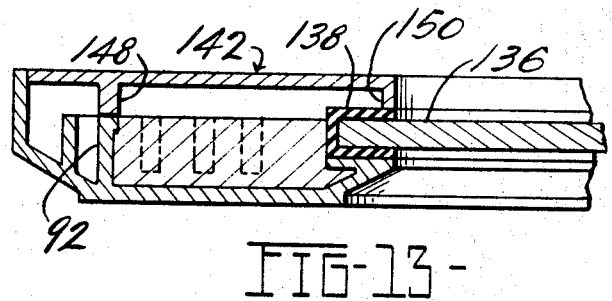
FIG-13-
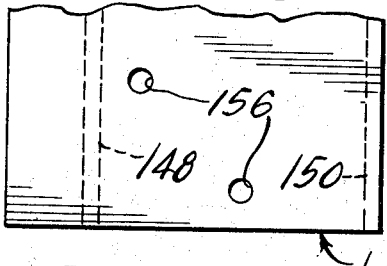
INVENTORS:
Xa D. JOHNSON.
GEORGE C. HILFINGER.
BY Owen & Owen
ATT'YS.

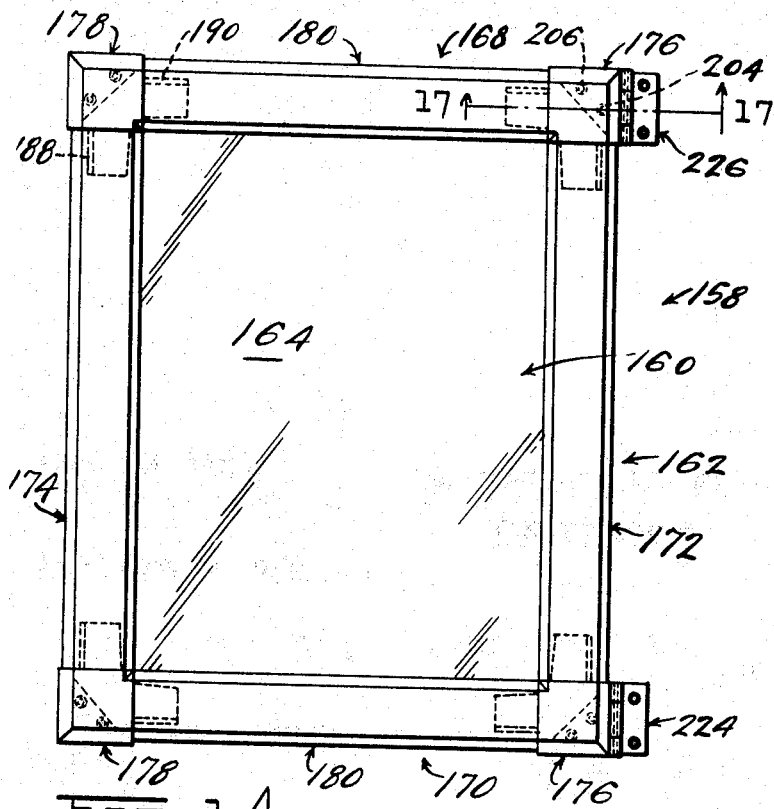
FIG-14-
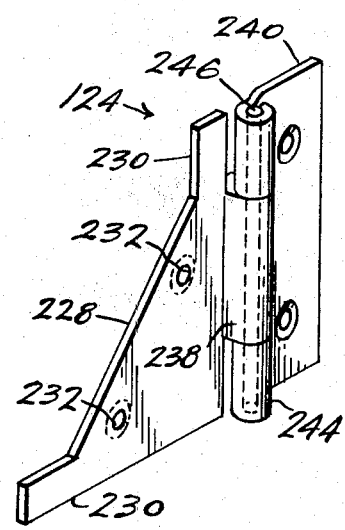
FIG-16-
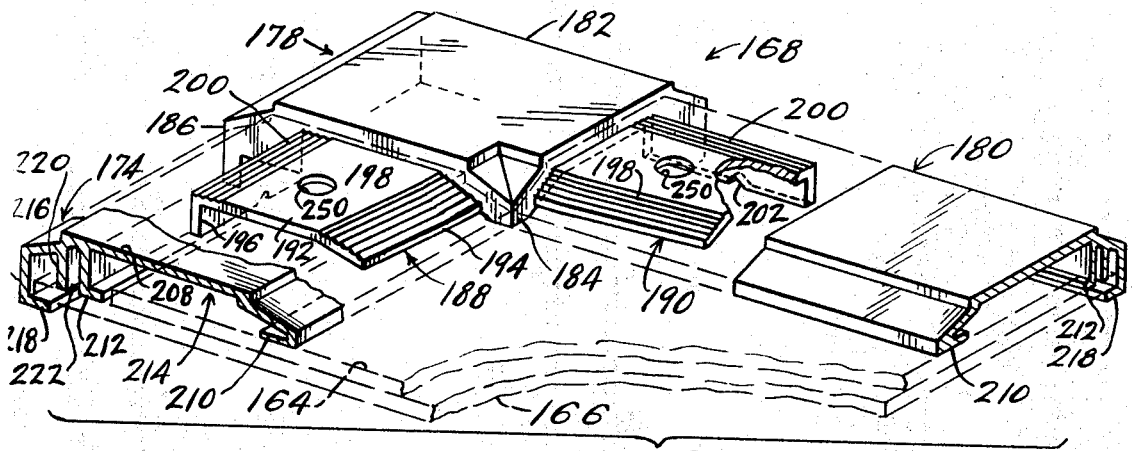
FIG-15-
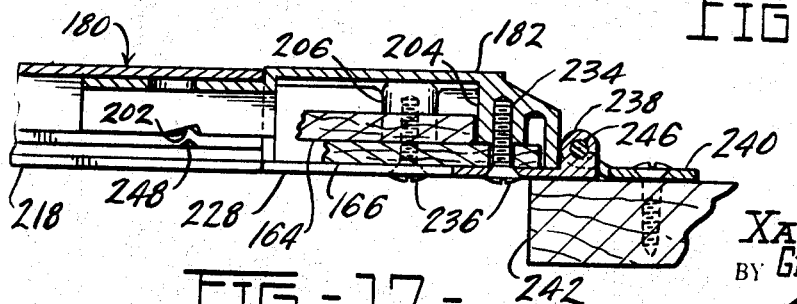
FIG-17-
INVENTORS:
XA D. JOHNSON,
BY GEORGE C. HILFINGER.
ATT'YS.

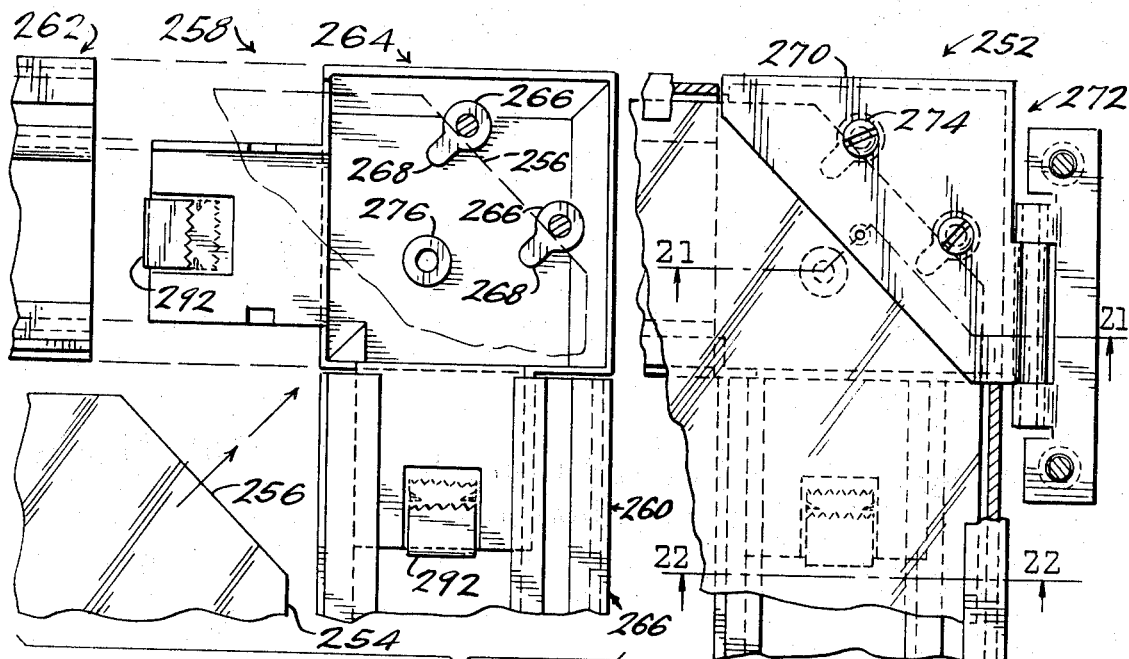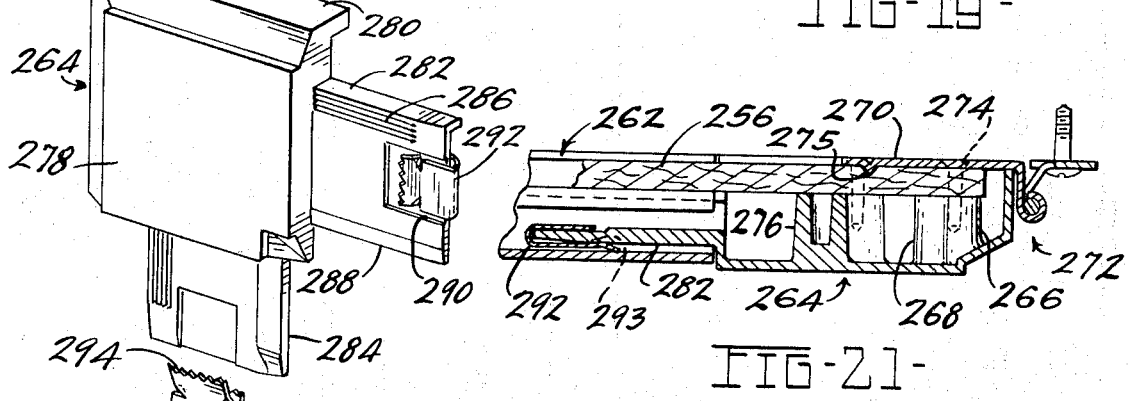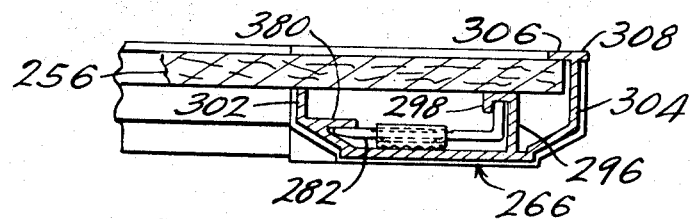

3,533,190
COMPOSITE DOOR
George C. Hilfinger and Xa D. Johnson, Toledo, Ohio, assignors to Wesley Industries, Inc., Toledo, Ohio, a corporation of Ohio
Continuation-in-part of application Ser. No. 609,972, Dec. 2, 1966, which is a continuation-in-part of application Ser. No. 566,030, July 18, 1966, which in turn is a continuation-in-part of application Ser. No. 348,696, Mar. 2, 1964. This application Sept. 3, 1968, Ser. No. 767,889
Int. Cl. E06b 3/00
U.S. Cl. 49—501            28 Claims

ABSTRACT OF THE DISCLOSURE

A composite door having a metal frame and a central door panel is designed particularly for kitchen cabinets. In one form, the central panel includes a front, decorative layer and a separate rear, supporting layer with the latter being affixed to the frame and the decorative layer being therebetween and allowed to float to accommodate temperature and humidity changes. The frame can include upper and lower die-cast frame members having integral tongues received in end channels of extruded side frame members. In this manner, doors of various lengths can be made simply by changing the length of the extruded side frame members. Also, the door can be made of four die-cast corner frame members with tongues received in extruded side frame members, as well as extruded upper and lower frame members. With this arrangement, doors of any size can be made by changing the lengths of the extrusions. The door also has other unique features including an arrangement for holding decorative strips.

---

This application is a continuation-in-part of our copending application, Ser. No. 609,972 filed Dec. 2, 1966, now abandoned, which is a continuation-in-part of application Ser. No. 566,030 filed July 18, 1966 and now abandoned, which is a continuation-in-part of application Ser. No. 348,696 filed Mar. 2, 1964, now Pat. No. 3,296,745.

This invention relates to a composite door and more particularly to a composite door comprising a frame and a central, separate door panel.

A door according to the invention primarily is designed for smaller applications, such as for cupboards, or closets, rather than for use as full-size interior or exterior doors. The new door includes a central panel, usually of wood or plastic, and an outer frame, preferably of metal, extending around the entire panel and preferably over the edges thereof. The new composite door has many advantages over conventional wooden ones. With the metal frame, the door is stronger, and with no seams or joints for wooden components, there is no chance for such seams or joints to expand, contract, or dry out because of temperature and humidity changes from season to season.

With the new door, a decorative layer of the central door panel can float relative to the frame to accommodate expansion and contraction of the panel without setting up stresses or opening seams. The composite construction also virtually eliminates warping because any tendency for the door panel to warp is resisted by the metal frame. The central panel of the new door is held by only a few fasteners so as to be easily removable to enable the decorative layer to be replaced by another panel of different design or color. This layer also can be made reversible, if desired, so that two different color schemes can be obtained with a single frame and panel.

The new composite door provides increased resistance to nicking and scratching, particularly at the edges thereof which, in the caes of the usual wooden doors, are quite susceptible to such damage. The metal frame also enables closer tolerances to be achieved to provide a better fit between the door and the door frame.

In one embodiment of the invention, the metal frame of the new door is made of four separable frame members, two opposite ones of which preferably are extruded with the other opposite two being cast, and preferably die-cast. With the upper and lower frame members being die-cast, they can be made in a relatively few number of widths for doors of a correspondingly few standard widths, with the extruded side frame members then being easily cut to any suitable length to achieve a door of the desired length. Hence, the tooling required for the upper and lower frame members is much less expensive than in the case where the entire door frame is die-cast and a separate die must be used for each size door. Not only is the tooling expense greatly reduced with the new door construction but the inventory for the frame members is also simplified. With the new construction, for example, a kitchen cabinet door and a broom closet door can be made with the same cast frame members, changing only the extruded side frame members and the panel to accommodate the different lengths. Also, in accordance with the invention, the die-cast members can be symmetrical so as to be used without further modification for both right-hand and left-hand doors. This further reduces tooling costs and simplifies inventory.

In another embodiment of the invention, the upper and lower frame members of the door can include die-cast corner members connected by extruded frame members similar to extruded side frame members. With this arrangement, the connecting extruded members can be cut to the desired length to achieve a door of any desired width. Hence, one-die-cast corner member is all that is required for any size door. This is particularly useful where a limited number of doors are expected to be produced and for which tooling costs must be kept within reason.

It is, therefore, a principal object of the invention to provide a composite door with a metal frame including two opposed frame members at least portions of which are die-cast, and two opposed extruded frame members, with a separate central door panel, which door has the advantages discussed above.

Other objects and advantages of the invention will be apparent from the following detailed description of preferred embodiments thereof, reference being made to the accompanying drawings, in which:

FIG. 1 is a view in perspective of a cabinet and two cabinet doors embodying the invention;

FIG. 2 is an enlarged front view in elevation of the right-hand door shown in FIG. 1;

FIG. 3 is a fragmentary view in vertical cross section taken along the line 3—3 of FIG. 2;

FIG. 4 is a view in perspective of a connecting portion of an upper frame member of the composite door;

FIG. 5 is a fragmentary view in cross section taken along the line 5—5 of FIG. 2;

FIG. 6 is a view in transverse cross section taken along the line 6—6 of FIG. 2;

FIG. 7 is a view in perspective of a side frame member of the door which member is to be assembled with the connecting portion of the upper frame member of FIG. 4;

FIG. 8 is a view in elevation of a slightly modified door embodying the invention;

FIG. 9 is a view in vertical cross section taken along the line 9—9 of FIG. 8;

FIG. 10 is a view in elevation of a back plate for one of the upper and lower frame members of FIG. 8 to engage a different door panel;

FIG. 11 is a view in vertical cross section of a lower frame member, back plate, and single-layer panel in assembled relationship;

FIG. 12 is a view in elevation of another back plate for one of the side frame members of FIG. 8;

FIG. 13 is a view in horizontal cross section of a side frame member, back plate, and single-layer panel in assembled relationship;

FIG. 14 is a front view in elevation of a slightly modified door embodying the invention;

FIG. 15 is an exploded, fragmentary view in perspective, with parts broken away and with parts in section, of a corner portion of the door of FIG. 14;

FIG. 16 is a view in perspective of a hinge used with the door of FIG. 14;

FIG. 17 is a fragmentary view in cross section taken along the line 17—17 of FIG. 14;

FIG. 18 is a rear, fragmentary view in elevation, on an enlarged scale, of a slightly modified door embodying the invention, a partially assembled state;

FIG. 19 is a view similar to FIG. 18 of the door after being assembled;

FIG. 20 is a view in perspective of a corner member of the door of FIGS. 18 and 19;

FIG. 21 is a view in transverse cross section taken along the line 21—21 of FIG. 19; and FIG. 22 is a view in transverse cross section taken along the line 22—22 of FIG. 19.

Referring particularly to FIG. 1, a cabinet indicated at 10, of any suitable construction and design, is closed by two substantially identical composite doors 12 and 14, each embodying the invention. The composite doors of the present invention are not limited to use with cabinets, however, and can be used for other applications, such as for broom closets, and the like. While the doors 12 and 14 as shown are of the overlay type, they can also be of the flush type or lip type, for example.

Referring particularly to FIG. 2, the composite door 12 includes a central door panel indicated at 16 and a metal frame indicated at 18. The panel 16 preferably is made of wood although other materials, such as plastic, can be employed. The panel includes, in this instance, a front board or decorative layer 20 of hardboard, for example, having at least an outer flat margin or edge portion of uniform thickness extending around the entire board to receive the metal frame. The panel 16 further includes a backing board or supporting layer 22, preferably of plywood, which extends beyond the edges of the front layer 20 to the outer edge portions of the metal frame 18, thereby providing greater stiffness for the door 12. As will be discussed later, the supporting layer 22 is affixed to the metal frame while the front layer 20 is only clamped between the layer 22 and the frame 18, being able to float to some extent, if required, to accommodate differences in temperature and humidity.

The metal frame 18 includes upper and lower frame members 24 and 26 along with a hinge side frame member 28 and a latch side frame member 30. The four frame members are securely joined together to provide a door which is much stronger than a conventional one made with wooden frame members having end joints which are subject to becoming loose an drying out. As the wooden frame members contract and expand, the joints also often separate, causing the paint to crack, thereby marring the appearance of the overall door.

In accordance with the invention, the upper and lower frame members can be die-cast while the side frame members 28 and 30 are extruded and are of uniform cross section throughout their length. Hence, the same die-cast end members can be used for a number of sizes of doors of different lengths simply by cutting the side frame members to appropriate lengths. Thus, the same upper and lower frame members can be used for a short single shelf cabinet, a longer four-shelf cabinet, and a broom closet, by way of example. The die costs are thereby greatly reduced since relatively few dies are required and they are much less expensive than dies for entire door frames made of one-piece die-cast metal. In addition, the doors shown can be used as either left or right hand doors with no design change required. For further economy, the upper and lower die frame members can be of identical shape to reduce the required number of dies by an additional fifty percent.

Referring more particularly to the details of the upper, die-cast frame member 24 in FIGS. 2 and 3, this member includes beveled edge portions 32 extending around most of the periphery thereof for decorative purposes, along with a symmetrical arcuate portion 33. As shown in FIG. 3, the upper frame member includes a wide web 34, an inner flange 36, which engages an edge portion of the central layer 20, and an outer flange 38, which extends around the outer edge of the upper frame member and is of sufficient width to extend to the rear surface of the supporting layer 22 of the panel. The exact arrangement for the outer flange will vary somewhat, depending upon the type of door under consideration. For example, with a lip-type door, the door panel 16 may extend within the door opening, in which instance the outer flange 38 will be shorter to contact the outer surface of the door frame around the opening. With a flush-type door, particularly a less expensive one, the flange 38 might not be used at all, in which instance the edges of the supporting layer 22 would be exposed when the door is open.

Sets of three bosses 40 are located at opposite end portions of the frame member 24 and are adapted to receive a hinge plate 42 (FIG. 5) of a suitable hinge 44 by means of screws 46. These can be of the self-tapping type. The inner bosses are provided with webs 48 extending toward one another to abut and center longitudinal edge portions of the decorative layer 20. The upper frame member 24 also has a central boss 50 which the upper edge of the decorative layer 20 abuts to position the upper edge of the layer and thereby further aid in centering the layer 20.

As shown in FIG. 3, the boss 50 can extend beyond the inner flange 36 a distance equal to the thickness of the layers 20 and 22 so as to be flush with the back of the supporting layer 22. The layer 22 has an opening 52 therein through which the boss extends with a large headed screw 54 then turned into the boss 50 until the head abuts the end of the boss, at which time the supporting layer 22 is held under predetermined pressure which is not dependent upon the degree to which the screw 54 is tightened. Otherwise, the boss 50 can simply extend beyond the flange 36 a distance equal to the thickness of the layer 20, in which instance the boss will contact the front surface of the layer 22 and the layer will be squeezed between the end of the boss and the head of the screw 54, when tightened. The bosses 40 can also be of either type of design.

The upper frame member 24 also has means for making a connection with the side frame members 28 and 30. Specifically, the upper frame member 24 includes spaced tongues 56 and 58 which are symmetrically alike with only the tongue 58 being discussed in detail. As shown in perspective in FIG. 4, the tongue includes a main web 60 terminating in a beveled edge or flange 62 and a perpendicular edge or flange 64, with raised portions or strips 66 and 68 extending along the edges of the web 60 and over the length thereof. As shown, the raised portions 66 and 68 have serrations or ridges 70 extending therealong. The serrations are deformed when the tongue is assembled with an end portion of the side frame member 30 to establish a secure connection between the two. The serrations accommodate slight differences in tolerances and, by being deformed, substantially eliminate the possibility that the tongue and extrusions can separate, particularly when subjected to vibration or jarring by the opening and closing of the door. As shown, the tongue 58 tapers from the base end to the outer end to facilitate assembly. The surface of the web 60 can be parallel to the main surface or web 34 of the upper frame member 24 while the lower edges of the flanges 62 and 64 taper toward the web 60.

Referring now in more detail to the lower die-cast frame member 26, this member includes a web 72 and a beveled edge portion 74 along with inner and outer flanges similar to the flanges 36 and 38. The lower frame member also has two sets of three bosses 76 to receive the hinge 44 in the same manner as for the upper frame member, with the inner bosses 76 having positioning webs 78 engageable with the lower longitudinal edges of the central panel 20. Two of the three bosses are located on the underside of tongues 80 and 82 rather than on the web portion 72 of the frame member 26. The tongues 80 and 82 otherwise are identical to the tongues 56 and 58 receiving the lower end portions of the side frame members 28 and 30, and will not be discussed in detail.

The extruded side frame member 28 is shown in more detail in FIG. 6. The member 28 includes a main web 84 and beveled edges 86. A channel 88 is formed in the side frame member by the web 84, an inner flange 90, and an outer L-shaped flange 92. The channel 88 is designed to receive one of the tongues 56, 58, or 80, 82 in closely fitting, snug relation. For this purpose, the beveled flange 62 of the tongue is received by the flange 90 of the channel while the outer perpendicular flange 64 of the tongue is received by the L-shaped flange 92. When the tongue is forced into the channel, the serrations of the tongue tend to bite into and be deformed by the extruded side frame member 28, with the two then remaining in snugly fitting, frictional relationship.

An outer flange 94 of the side frame member has a width equal to that of the outer flanges of the upper and lower frame members and preferably is sufficient to extend to the rear surface of the supporting layer 22 for appearance purposes. An auxiliary flange 96 can be located between the flanges 92 and 94, extending the same distance as the L-shaped flange 92, namely to the front surface of the supporting layer 22. The flanges 92 and 96 thereby provide a support for the supporting layer 22 and are spaced apart a distance such as to form a channel 98 which receives self-tapping or sheet metal screws when turned thereinto. The screws can be used to hold a door handle and also to hold edge portions of the supporting layer 22, with the number of screws employed depending upon the length of the door. For shorter doors, no screws are required for the side frame member whereas for the longer, closet doors, several screws may be employed at predetermined intervals, such as twelve inches, along the side frame members.

The side frame member 30 can be identical to the side frame member 28 and will not be discussed in detail.

A suitable handle can be employed on the door in any desired position and a suitable latch can be employed on the door frame. In the event that a latchless type of door hinge is employed, then the latch can be omitted, as is known in the art.

FIGS. 8 and 9 show a slightly modified embodiment of the invention. A door indicated at 100 includes a central door panel indicated at 102 and a metal frame indicated at 104. Like the panel 16, the panel 102 includes a front, decorative layer 106 having an outer flat margin or edge portion extending around the periphery to receive the metal frame. The panel also includes a rear supporting layer 108 which extends beyond the edges of the front layer 106 to outer edge portions of the metal frame 104. As is true of the panel 16, the supporting layer 108 is affixed to the metal frame while the front layer 106 is clamped between the layer 108 and the metal frame 104.

The panel 102 differs from the panel 16 principally in that decorative strips or dowels 110 are located in front of the decorative layer 106 and held by the frame. The decorative strips 110 are not affixed to the front layer 106 so that this layer can float both horizontally and vertically to accommodate differences in temperature and humidity. The strips 110 can also expand longitudinally.

The metal frame 104 includes upper and lower frame members 112 and 114 and side frame members 116 and 118. The four frame members can be joined together in the same manner as those of the frame 18 with the side frame members 116 and 118 being extruded and the upper and lower frame members 112 and 114 being die-cast. In this instance, the upper and lower frame members 112 and 114 are identical to further reduce die and tooling costs.

As shown in FIG. 9, each of the upper and lower frame members includes a beveled edge portion 120 extending around the periphery thereof and having scallops 122 with projections 124 therebetween at the edge of the frame member which extends toward the opposite frame member. Each of the frame members also includes a web 126 constituting a main surface of the frame member, an inner flange 128 which engages the front layer 106, and an outer flange 130 which extends around the outer edge of the frame member and is of sufficient width to extend to the rear surface of the supporting layer 108 of the panel 102.

In accordance with the invention, the frame members 112 and 114 have notches 132 in the projections 124 to receive the strips or dowels 110 and hold them against the front surface of the front layer 106. The frame members also have stops 134 which at least one end of the strips 110 can abut to maintain the strips centered relative to the frame.

In some instances, it may be desired to provide a central panel for the door which is not composed of a front, decorative layer and a rear, supporting layer. This is particularly true if the panel is made of glass or is an open grid made of expanded metal, for example. In such instances, the metal frame is provided with back plates used to clamp the single layer panel in place yet still enable floating movement thereof.

Referring to FIGS. 10-13, a modified door employing an open metal grid 136 is shown employed with a metal door frame having four frame members which can be identical with the four frame members 112-118 of FIGS. 8 and 9. In this instance, however, what would constitute the front, decorative layer of the panel is the grid 136 which, if thinner than the ordinary decorative layer, is increased in thickness by a rubber edge molding or strip 138. In place of the back, supporting layer of the panel, back plates 140 and 142 are employed. The back plate 140 is die-cast and has a contour, as shown in FIG. 10, similar to the upper and lower frame members 112 and 114, except for the tongues. The back plate 140 has an outer stiffening flange 143 fitting within the outer flange 130 of the side frame member 114 and has an inner scalloped flange 144 which contacts and helps to support the rear surface of the panel 136. Intermediate flanges 146 engage and slightly compress the resilient strip 138 to hold the panel 136 in place. In this instance the strip 138 is compressed against the decorative strips 110.

The back plates 142 for the side frame members 116 and 118 have flanges 148 positioned to bear against the L-shaped flanges 92 of the side extruded frame members and have inner flanges 150 extending the length thereof and engaging the vertical resilient strips 138 to hold them securely between the back plates and the inner flanges 90 of the extruded side frame members. In this manner, the back plates 140 and 142 hold the panel 136 securely in place along substantially the entire length of both vertical edges thereof as well as at additional points at the top and bottom.

The back plates 140 have openings 152 to receive fasteners for the bosses of the upper and lower frame members 112 and 114 with short bosses 154 around the openings 152 to cooperate with the main bosses of the upper and lower frame members. The extruded back plates 142 have openings 156 drilled therein to receive fasteners to enable these plates to be fastened to the outermost two of the three bosses at each end of the frame members 112 and 114, for example.

The embodiment of the invention shown in FIGS. 14–17 includes extruded frame members for the upper and lower frame members to accommodate different widths of doors as well as different lengths of doors, with the use of the same die-cast frame members. Referring to FIG. 14, a composite door designated 158 includes a central door panel 160 and a metal frame 162. The panel 160 again can be made of wood or other suitable materials and includes a front board or decorative layer 164 and a backing board or supporting layer 166 (see FIG. 17 also). Each of the layers can constitute three-sixteenth inch plywood, each of which has one finished surface. The finished surface of the decorative layer 164 faces the front while the finished surface of the supporting layer 166 faces the rear. While a single, thicker panel can be employed, the two aforementioned layers are substantially no more expensive and the two-layer panel has the advantages again that the front, decorative layer can float.

The metal frame 162 includes upper and lower frame members 168 and 170, a hinge side frame member 172, and a latch side frame member 174. The upper and lower frame members, in this instance, each include die-cast corner frame members 176 and 178 and extruded connecting frame members 180. The connecting extruded frame members 180 can be cut to any desired length to enable the door to be made of any desired width, as well as length, with the use of only the die-cast corner frame members 176 and 178 which can be identical, if desired.

The upper die-cast corner frame member 178 is shown in more detail in FIG. 15. It includes a web portion 182, an inner flange 184 which engages an edge portion of the decorative layer 164, and an outer flange 186 which extends to the rear surface of the supporting layer 166. The corner frame member 178 has means for being assembled with the side frame member 174 as well as the connecting frame member 180. For this purpose, the frame member 178 has two mutually perpendicular tongues 188 and 190 which can be identical, with only the tongue 188 being discussed in detail. The tongue includes a main web 192 terminating in a beveled edge or flange 194 and a perpendicular edge flange 196. In this instance, the upper surface of the flange 194 and a portion of the web 192 adjacent the edge flange 196 have serrations or ridges 198 and 200 thereon which again are deformed when assembled with the other frame members. The edge flanges 196 of the tongues can have notches 202 therein to effect a more secure mechanical connection with the extruded frame members, as will be discussed more fully subsequently.

The corner frame members 176 and 178 have bosses 204 and 206 (FIG. 17) integral therewith to receive fasteners. The bosses extend rearwardly from the web 182 a sufficient distance to abut the inner surface of the rear supporting layer 166 and maintain the exposed surface thereof flush with the edge of the flange 186.

The extruded frame members, 172, 174, and 180 can be identical. As shown in FIG. 15, the extruded frame member 174, for example, includes a main web 208, an inner flange 210, and an intermediate L-shaped flange 212. These form a channel 214 designed to receive one of the tongues 188 or 190 in close fitting, snug relation. The extruded frame members 172, 174, and 180 differ from the extruded frame members 28 and 30 in that an outer flange 216 extends beyond the rear surface of the supporting layer 166 and further has an inwardly extending leg or lip 218 extending over an edge portion of the layer 166. This establishes a neat joint between the frame and the supporting layer 166 even though the layer 166 is not of precise dimensions. The lip or leg 218 also aids in reducing the screw requirement for fastening the panels to the metal frame. An auxiliary flange 220 is located between the flanges 212 and 216 to provide a channel 222 for screws.

Hinges 224 and 226 can be affixed to the die-cast corner members 176. As shown in FIG. 16, the hinge 224 includes a generally triangular hinge plate 228 having end extensions 230 and openings 232 to receive fasteners 234 (FIG. 17) which extend through the holes 232, through appropriate holes 236 in the supporting layer 166, and into the bosses 204 and 206. The screws 234 can be driven into the bosses with the aid of a torque screwdriver to prevent undue pressure on the supporting layer 166. The hinge also includes an intermediate sleeve 238 integral with the plate 228 and a second hinge plate 240 which is affixed to a frame 242 of the cabinet and has end sleeves 244 which are pivotally connected with the sleeve 238 by a hinge pin 246.

The upper hinge 226 is substantially identical to the hinge 224 except that the hinge plates are shaped and positioned to fit with the upper corner member 176. The thickness of the hinge plate 228 is equal to the difference in depth of the outer flange 216 of the extruded member and the outer flange 186 of the corner member. In this manner, the hinge plate 228, when affixed to the rear surface of the supporting layer 166, is flush with the lip 218 of the flange 216, as shown in FIG. 17.

In assembling the components of the door 158, the corner members 176 and 178 of the lower frame member 170 are assembled with the lower connecting member 180 and with the side frame members 172 and 174, with the tongues 188 and 190 positioned in the channels 214 thereof. The flange 212 is then staked or indented as shown at 248 in FIG. 17 to form a secure mechanical interconnection between the tongue and the extruded member. After the aforementioned five frame components are assembled, the front layer 164 and the rear layer 166 can be assembled with these frame members by sliding the panel layers into the frame from the upper end thereof, with the rear supporting layer 166 located behind the flange lips 218. The corner frame members 176 and 178 of the upper frame member 168 are then assembled with the upper extruded member 180 of the upper frame member and staked, as before. These three components constituting the upper frame members 168 are then assembled with the side frame members 172 and 174. The four fasteners 234, which can be self-tapping, are then used to assemble the corner frame members 176, the supporting layer 166 and the hinge plate 228 of the hinges 224 and 226. Additional fasteners 234 can be used at the corner members 178 in the same manner as for the members 176 but with single plates similar to the hinge plates 228 substituted for the entire hinges 224 and 226. Thus, only eight screws are needed to complete the door assembly, although middle screws in the side, upper and lower frame members can be used for larger doors.

The tongues 188 and 190 can be provided with holes 250, if desired. If a handle is to be employed at the latch side of the door, a fastener therefor can extend through one of the holes 250 with appropriate holes drilled in the extruded member and panel. This further aids in maintaining the door components in assembled relation.

As shown in FIG. 14, the corner frame members 176 and 178 can be slightly larger than the side frame members 172 and 174 and the connecting members 180 to provide definite joints at the meeting portions thereof. This eliminates the necessity of otherwise precisely matching the joints.

The corner frame members 176 and 178 can be of numerous shapes and styles. While the overall design of the door is somewhat more limited with the frame 162 than when the upper and lower frame members are entirely die-cast, nevertheless, particularly with limited production doors, the advantages achieved through the use of the die-cast corner members, mainly through lower die costs, more than offset the design limitations.

A slightly modified door 252 of FIGS. 18–22 is similar in basic respects to the composite door 158 of FIGS. 14–17. The door 252, however, contains essentially a single-layered door panel and a different means of connecting the corner frame members to the connecting frame members. The door 252 in this instance includes a single central door panel 254 which can comprise plywood or a similar base with a decorative textured sheet adhered to the front surface thereof. In any event, however, the panel 254 is not made of separate and separable layers as is the case with the embodiment of FIGS. 14–17, for example. In the event it is desired to change the decorative exposed surface, an additional decorative sheet can be applied to the panel 254 or the panel can be removed and reversed, if having a suitable decorative surface on the reverse side. Another distinction of the panel 254 is that, rather than being square, it has diagonally-cut corners 256 which facilitate assembly of the panel with the frame, as will be discussed subsequently.

The door frame includes an upper frame member 258 and a side frame member 260 with the upper frame member including an extruded metal connecting frame member 262 and a die-cast corner frame member 264. The side frame member 260 includes an extruded connecting frame member 266 similar to the member 262. The extruded frame members 262 and 266 can be cut to any desired length to enable the door of desired length and width to be produced, as is true of the door 158. The opposite frame members are similar to the members 258 and 260 and will not be shown or discussed in detail.

The die-cast corner frame member 264 is similar to the member 178 of FIG. 15, but, as shown in FIGS. 18 and 19, has a pair of rear fastener-receiving projections or bosses 266 with ribs 268. The ribs 268 provide better support for the front surface of the panel 254 when assembled with the frame members. When assembled, the diagonal corner 256 extends over the ribs 268 and is held thereagainst by a hinge plate 270 of a hinge 272 which is similar to the hinge 124 of FIG. 16. The hinge plate 270 is held in engagement with the rear surface of the panel 256 by self-threading screws or other fasteners 274 threaded through openings in the plate 270, past the diagonal corner 256 of the panel 254 and into blind holes in the bosses 266. The panel 254 thereby is clamped between the ribs 268 and the hinge plate 270 by the fasteners 274. A short projection 275, formed in the plate 270 by dimpling the back, bites into the panel 254 and further increases the clamping effect between the panel and the frame. Corner plates employed at the latch edge of the door are identical to the plates 270, with the hinge knuckle eliminated, of course. Because there are no holes in the panel 254 to provide a fixed mechanical connection between the panel and the fasteners 274, the panel is free to float to a limited extent relative to the frame, to accommodate temperature and humidity changes. The panel also is easier to assemble and less precision is required. The corner member 264 can have a third projection or boss 276, if desired, to provide additional support for the panel 254.

The corner member 264 is similar in design to the member 178 including the fact that the corner member is larger than the extruded frame members to provide a stepped configuration therewith both at a web portion 278 and outer flanges 280. This has the advantage of reducing the precise tolerances otherwise required in smoothly matching the joints. The outer flanges 280 are shorter than the corresponding flanges of the extruded members by the thickness of the plate 270 to enable the plate to be flush with the outer flanges of the extruded frame members. This provides a smoother appearance and also enables the door to close more fully. Tongues 282 and 284 of the corner frame member 264 differ from the tongues 188 and 190 in that serrations 286 are provided only at one portion thereof and not on a tapered or beveled edge 288. Outer ends of the tongues also have recesses 290 which receive clips 292. The clips are squeezed on the ends of the tongues and held by barbs 293. The clips also have teeth 294 extending rearwardly to resist movement of the tongues out of the channels of the extruded frame members. The serrations 286 provide some holding power between the die-cast and extruded frame members but the clips provide the main resistance force.

The extruded frame members 262 and 266 are identical, with the member 266 shown in cross section in FIG. 22. The extruded frame member is also similar to the extruded frame member of FIG. 15, for example, with some variations. In this instance, an L-shaped flange 296 corresponding to the flange 212 further has an upwardly-extending lip 298 to provide better engagement with the tongue, with an inner flange 300 cooperating with the flange 296 to form the channel for the tongue. The extruded frame member also has an inner flange 302 extending rearwardly to the panel 256 which accommodates the difference in thickness of the panel 256 and the panel 160. An outer flange 304 has an inwardly-extending lip 306 extending over the edge of the panel 256 to provide a neater joint and to aid in holding the panel 256 in place. The lip 306 provides a reasonably snug fit for the edge of the panel 256 between the lip and the flange 296, as shown in FIG. 22. The flange 304 further has an outwardly-extending lip 308 which extends outwardly to be in line with the outer flange 280 of the corner member 264.

With the above construction, the panel 256 can be removed completely, if desired, by simply loosening the fasteners 266 at corner members and tapping outwardly on a connecting frame member, preferably on the latch edge of the door, to separate the frame members. The panel can then be slid out and a new one inserted.

Various modifications of the above described embodiments of the invention will be apparent to those skilled in the art, and it is to be understood that such modifications can be made without departing from the scope of the invention, if they are within the spirit and the tenor thereof.

We claim:
1. A composite door comprising a door panel including a rear, supporting layer and a separate front, decorative layer having an edge portion extending around the periphery thereof, said edge portion being of uniform, predetermined thickness, a metal frame extending around said panel and over the edge portion of said front layer, said frame comprising four separate frame members including a latch side frame member, a hinge side frame member, an upper frame member, and a lower frame member, each of said frame members having a web and an inner flange integral with said web and in contact with the edge portion of said front layer, said frame members also having outer integral flanges extending in the same direction from said web as said inner flanges, said outer flanges being of sufficient width to extend at least to the back surface of said supporting layer, said upper and lower frame members being, at least in part, of die-cast metal and having integral means to receive fasteners for attaching said rear, supporting layer thereto with said decorative layer therebetween but not directly engageable by the fasteners whereby said front panel can float relative to said frame members, said frame members having additional integral means to receive fasteners for hinges, said upper and lower frame members also having spaced tongues to receive end portions of said side frame members, said side frame members being extruded, of uniform cross section throughout their lengths, and having longitudinal main channels to receive said tongues.

2. A door according to claim 1 characterized by said side frame members having narrow, fastener-receiving channels parallel to said main channels and capable of receiving additional fasteners for assembling said supporting layer with said side frame members.

3. A door according to claim 1 characterized by said tongues of said upper and lower frame members having a plurality of ridges along those surfaces engaging the channels of said extruded members, said ridges being deformed when said frame members are assembled.

4. A composite door according to claim 1 characterized further by at least some of said outer flanges having inwardly extending lips positioned to extend over the edges of said supporting layer.

5. A composite door according to claim 1 characterized by at least one of said upper and lower members comprising die-cast corner members and a connecting member.

6. A door according to claim 5 characterized by said corner members having tongues to receive end portions of said connecting member, said connecting member being extruded, of uniform cross section throughout its length, and having a main channel to receive the tongues of said corner members.

7. A composite door comprising a door panel having an edge portion extending around the periphery of said panel, a metal frame extending around said panel and over the edge portion thereof, said frame comprising four separate frame members including a latch side frame member, a hinge side frame member, an upper frame member, and a lower frame member, at least part of each of two opposed frame members being die-cast and having means to connect end portions of the other two frame members, said other two frame members being extruded, of uniform cross section throughout their lengths, and having means at the end portions to cooperate with said connecting means of the first two frame members, at least some of said frame members having means to receive fasteners for affixing said panel thereto, said extruded frame members having narrow, fasteners-receiving channels parallel to the longitudinal extent thereof and capable of receiving fasteners for assembling said panel with said extruded frame members.

8. A composite door according to claim 7 wherein at least one of said first two frame members includes die-cast corner members and an extruded connecting member.

9. A composite door according to claim 8 wherein each of said first two frame members comprise said corner members and said connecting member, with said connecting means being associated with said corner members.

10. A composite door according to claim 7 characterized by said extruded frame members having L-shaped flanges extending rearwardly therefrom around edges of said door panel.

11. A composite door according to claim 8 characterized further by said corner members being larger than said extruded side frame members wherein said corner members and said side frame members meet in a stepped configuration.

12. A composite door according to claim 8 characterized further by at least some of said corner members having means thereon to receive at least one fastener, a hinge including a hinge plate, and a fastener extending through said plate and said panel and into said receiving means.

13. A composite door comprising a door panel, a metal frame around said panel and engaged therewith, said frame comprising four separate frame members including a latch side frame member, a hinge side frame member, an upper frame member, and a lower frame member, each of two opposed frame members having tongues near ends thereof with the tongues of each of said opposed frame members extending toward the other, the two opposed frame members being of uniform cross section throughout their lengths and having channels extending longitudinally thereof to receive said tongues at the ends of the first opposed two frame members, a plurality of decorative strips in front of said door panel, with two opposed frame members having notches therein to receive the ends of said decorative strips and to hold them in position adjacent, but movable with respect to, said door panel.

14. A composite door according to claim 13 wherein said door panel comprises a front decorative layer, and a separate, rear supporting layer.

15. A composite door according to claim 13 wherein said notches are in said upper and lower frame members and said upper and lower frame members are identical in size and shape.

16. A composite door according to claim 13 wherein said upper and lower frame members and said side frame members having back plates fastened thereto with means effective to engage and to aid in holding edge portions of said door panel.

17. A composite door comprising a door panel, a frame around said panel and engaged therewith, said frame comprising at least four frame members including a latch side frame member, a hinge side frame member, an upper frame member, and a lower frame member, each of two opposed frame members having tongues near end portions thereof with the tongues of each of said two opposed frame members extending toward the other, the other two opposed frame members being of uniform cross section throughout their lengths and having channels extending longitudinally thereof to receive the tongues of the first two opposed frame members, said door frame having means along each longitudinal edge thereof to enable hinges to be affixed thereto, whereby said door can be used as a left-hand or a right-hand door.

18. A composite door according to claim 17 characterized further by said tongues having clips over the outer ends thereof, said clips having teeth engaged with at least one surface of the cooperating channel when assembled therewith to inhibit movement of the tongue out of the channel.

19. A door according to claim 17 characterized by the first two opposed frame members having the tongues extending from corner members of said first opposed frame members, and said hinge-affixing means along each longitudinal edge are part of said corner members.

20. A composite door comprising a door panel, a metal frame extending around said panel and over edge portions thereof, said frame comprising at least four separate frame members including a latch side frame member, a hinge side frame member, an upper frame member, and a lower frame member, said frame members having webs and inner flanges integral with said webs and in contact with the edge portions of said panel, said frame members also having outer integral flanges extending in the same direction from said webs as said inner flanges, said outer flanges being of sufficient width to extend at least to the back surface of said panel, at least parts of two opposed frame members being of die-cast metal and having integral means to receive fasteners for holding said panel and for fastening hinge plates of hinges thereto, said two opposed frame members also having spaced tongues to receive end portions of the other two opposed frame members, said latter two frame members being extruded, of uniform cross section throughout their lengths, and having main longitudinal channels to receive said tongues, said outer integral flanges of at least said latter two frame members having inwardly-extending lips positioned to extend over the back edge portions of said door panel to aid in maintaining said panel in place.

21. A composite door according to claim 20 characterized by said parts of said upper and lower frame members which are of die-cast metal are corner members having said integral means for fasteners and having said spaced tongues, said corner members having outer integral flanges extending in the same direction as said outer flanges of said frame members and extending a distance less than said outer flanges of said frame members by an amount substantially equal to the thickness of a hinge plate to enable the hinge plate to be flush with the outer flanges of said frame members.

22. A composite door according to claim 20 characterized by said integral means to receive fasteners of said first two opposed frame members projecting rearwardly from said frame members, and in contact with an outwardly-facing surface of said door panel, hinge plates, and fasteners received by said projecting integral means and holding portions of said hinge plates in contact with the rearwardly-facing surface of said panel on the side opposite said projecting integral means.

23. A composite door comprising a door panel, a frame extending around said panel and over edge portions thereof, said frames comprising at least four separate frame members including a latch side frame member, a hinge side frame member, an upper frame member, and a lower frame member, said frame members having webs and inner flanges integral with said webs and in contact with edge portions of said panel, said frame members also having outer integral flanges extending in the same direction from said webs as said inner flanges, said outer flanges being of sufficient width to extend at least to the back surface of said panel, at least parts of two opposed frame members having integral means to receive fasteners for holding said panel and for fastening hinge plates of hinges thereto, said two opposed frame members also having spaced tongues to receive end portions of the other two opposed frame members, said latter two frame members being of uniform cross section throughout their lengths and having main longitudinal channels to receive said tongues, said parts of said first two opposed frame members constituting separate corner members having said integral means for receiving fasteners, said corner members being larger than said latter two frame members wherein said corner members and said latter two frame members meet in a stepped configuration.

24. A composite door comprising a door panel, a frame extending around said panel and over edge portions thereof, said frame comprising at least four separate frame members including a latch side frame member, a hinge side frame member, an upper frame member, and a lower frame member, corner portions of two opposed frame members having rearwardly-projecting means to receive fasteners and at least partially engaging an outwardly-facing surface of said panel, plates overlying portions of said panel on the side opposite said projecting means, two of said plates along a common edge of said door being hinge plates to which additional hinge plates are connected for hinging the door to a door frame, and fasteners extending through said plates and received by said projecting means to hold portions of said panel between said plates and said projecting means.

25. A composite door according to claim 24 characterized by said plates having projections biting into said panel portions.

26. A small, decorative composite door for a kitchen cabinet or the like comprising a door panel having an exposed decorative surface, a metal frame around said panel and engaged therewith, said frame comprising four separate frame members including a latch side frame member, a hinge side frame member, an upper frame member, and a lower frame member, each of two opposed frame members being of one piece, die-cast construction with two integral tongues near end portions thereof with the tongues of each of said frame members extending toward the other, the other two opposed frame members being of uniform cross section throughout their lengths and having channels extending longitudinally thereof to receive said tongues at the ends of said first two frame members, and clip means carried by said tongues and engaged in said channels to increase the holding power of said channels and tongues.

27. A composite door according to claim 26 characterized by said first two opposed frame members being said upper and lower frame members and said other two opposed frame members being said side frame members.

28. A composite door according to claim 28 wherein said side frame members are of extruded metal.

References Cited

UNITED STATES PATENTS 3,177,989  4/1965  Di Chiaro _____ 49—501 XR
1,916,189  7/1933  Bales _____ 49—400

FOREIGN PATENTS 590,954  8/1947  Great Briatain.

KENNETH DOWNEY, Primary Examiner

U.S. Cl. X.R.

49—402; 52—656